Dec. 19, 1933.  F. B. ADAM  1,939,645

ELECTRIC FIXTURE SUPPORT

Filed Nov. 8, 1929

INVENTOR
FREDERICK B. ADAM
BY
*Eilers & Schaumburg*
ATTORNEYS

Patented Dec. 19, 1933

1,939,645

UNITED STATES PATENT OFFICE 1,939,645

ELECTRIC FIXTURE SUPPORT

Frederick B. Adam, St. Louis, Mo., assignor to Frank Adam Electric Co., St. Louis, Mo., a corporation of Missouri Application November 8, 1929. Serial No. 405,667

12 Claims. (Cl. 247—20)

This invention relates to improvements in electric fixture supports, and more particularly to an improved combination receptacle and fixture support, adapted for mounting fans, heating appliances and fixtures of similar character.

An object of my invention is that of providing an electric fixture support associated with the usual electrical outlet and having means enabling the ready and facile installation and removal of fixtures of the above mentioned class.

Another object is that of providing, in connection with an outlet box, an improved fixture support and cover plate adapted to be positioned angularly with respect to the box. Thus, the cover plate and other visible members may be horizontally and vertically aligned, even though the box, through necessity or because of an inadvertent setting thereof, be obliquely positioned within a wall.

A further object contemplates the provision of means, associated with the recited fixture support, enabling the support to be distantly as well as angularly adjustable relative to the outlet box. Through this provision the box is adapted to be set at any practical wall depth.

Figure 1:
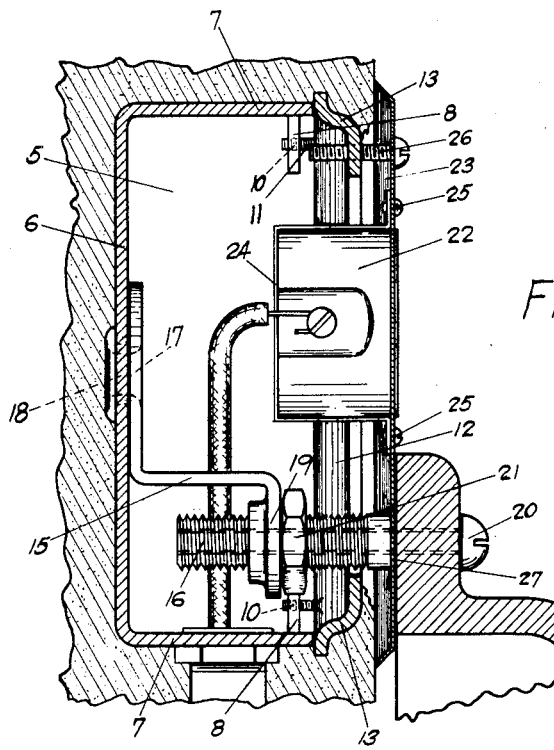
Figure 2:
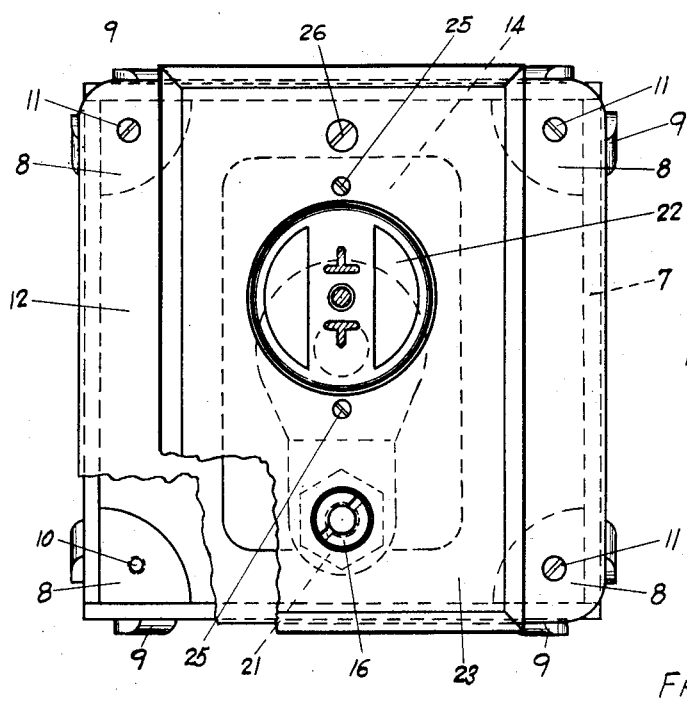

Other objects and advantages will appear from the following detailed description and accompanying drawing, in which Fig. 1 is a vertical section through a wall, having an outlet box imbedded therein, and a portion of a fixture base supported by the box; Fig. 2 is a fragmentary plan view of the device of my invention.

Referring now by numerals to the drawing, 5 designates, generally, a metal outlet box having a bottom 6, and walls 7. Adjacent walls are secured together by means of corner supports 8, provided with ears 9 which are adapted to extend through suitable apertures in the walls. Portions of the ears 9 extending beyond the outer wall surface are turned downwardly to engage their respective walls, preventing separation thereof. Each corner support is provided with a threaded aperture 10 for receiving plaster ring holding screws 11. The plaster ring or cover 12 is preferably dished, forming shoulders 13, for the purpose of providing a definite plaster line about the ring. Centrally disposed in the plastering is a rectangular opening 14, which provides entrance into the box when it is positioned in a plastered wall. For securing the cover or plaster ring onto the box I provide screws 11 which extend through suitable openings in the cover plate, one at each corner thereof, and engage the corner members 8 through the recited apertures 10.

The fixture support to which I have hereinbefore referred comprises an angulate bracket 15, adjustably secured to the box bottom in a manner to be hereinafter described, and a threaded stud 16, carried by the recited bracket. One end of the bracket 15 is provided with a flared aperture 17, and connection between box and bracket is effected by spinning the flared material, immediately surrounding the aperture 17, through a circular aperture 18 disposed in the bottom of the box, the recited material embracing the material adjacent said aperture. In this manner the bracket is securely attached and may be adjusted to any desired angular position relative to the box.

The free end of the bracket is provided with a tapped aperture 19, having its margins preferably turned inwardly, as shown, to provide a greater surface for engaging the threaded stud 16. The stud is preferably drilled and threaded to receive a screw 20 for holding a fixture as shown.

A lock nut 21 carried by the stud serves to fix this member to the bracket after it has been adjusted to the desired position. A receptacle 22, of conventional type and form, is carried by a finish plate 23, being held thereto as by means of an angulate strap member 24 and screws 25. The finish plate is held to the plaster ring 12 by a single screw 26 and is provided with an aperture 27 through which the stud 16 is adapted to extend, for engagement with a fixture. The finish plate and attending receptacle may be turned about the screw 26 as a center, to allow them to be vertically aligned should the box be set angularly in a wall. The aperture 27 is preferably of greater diameter than that of the stud 16 to allow for the arcuate movement of the stud 16, relative to the finish plate, and any movement of the plate relative to the stud.

It will be noted that the fixture is supported by the box proper and not by the cover or a mounting plate as is the case in former devices of similar character. Furthermore, as shown in Fig. 1, the fixture support assembly extends entirely through the box and two walls thereof; the finish plate being here regarded as the equivalent of a wall. The herein described construction has been found advantageous since it provides a very solid foundation, especially desirable for the support of fans and other devices having moving parts.

While I have shown and described a single preferred executional embodiment of my invention, it will be understood that parts may be added or interchanged producing a device which still comes within the scope of my invention.

I claim as my invention:

1. In combination with an outlet box having an apertured wall, an angularly adjustable fixture bracket having a base portion engaging the wall adjacent the margins of the aperture therein, a hub, struck from said base portion, extending through and journalled in said aperture, said hub having an annular end flange, embracing the periphery of said aperture.

2. In combination with an outlet box, means forming a fixture support, said supporting means including a spacer member bent to form parallel end portions, one of such portions having an integrally formed hub extending through and journalled in the box bottom, a stud threadedly engaging the other of said end portions, and adapted upon adjustment, with said spacer member, to be angularly and distantly positioned relative to the box.

3. In combination with an outlet box for receptacles and the like, means forming a fixture support, said means including an angulate bracket element having an integrally formed, tubular projection extending through, and journalled in a wall of said box, and a stud, threadedly associated with said element.

4. In combination with an outlet box for receptacles and the like, means forming a fixture support, said means including a bracket having an integral, journal-forming portion extending through and journalled in a wall of said box, and a stud threadedly associated with said bracket.

5. In combination with an outlet box, means forming a fixture support, said means including a bracket having one end secured in angularly adjustable relation to the box bottom and having an interiorly threaded aperture at the other end, a stud supported by said bracket through said aperture and means associated with said stud for engaging a fixture.

6. In combination with an outlet box, means forming a fixture support, said means including a bracket having a portion extending through and pivotally engaging a wall of said box, a threaded aperture in said bracket, a stud in said aperture and supported by said bracket and means associated with said stud for engaging a fixture.

7. In combination with an outlet box, means forming a fixture support, said means including a bracket secured to the box proper, in angularly adjustable relation thereto, a stud threadedly associated with said bracket for longitudinal adjustment relative thereto, means associated with said stud for fixing its position relative to said bracket, and means connected with said stud for engaging a fixture.

8. In combination, an outlet box, a finish plate having spaced apertures therethrough, an angularly adjustable bracket arm adapted to provide a fixture support, extending from the bottom of said box, and means, carried by said box and fixture support, extending through said plate apertures for fixing the angular position of said plate relative to the box.

9. In combination, an outlet box, an apertured, outwardly dished cover plate fixedly secured to the box, a finish plate adjustably secured to said cover plate, a fixture supporting member journaled in, and extending from the bottom of said box, and adapted to be angularly positioned relative to said box.

10. In combination with an electrical outlet including a box, a cover for said box, and a finish plate pivotally carried by said cover, fixture supporting means extending from the bottom of said box through said cover, and adapted to angularly position said finish plate relative to said box and cover.

11. In combination with an outlet box having an apertured wall, a bracket formed of strip metal, disposed within the box, said bracket having an integral, tubular projection, extending from one face of the bracket through said wall aperture, said tubular projection having a flanged end portion engaging the outer periphery of said wall aperture for pivotally securing the bracket to said box.

12. In combination with an outlet box, a fixture support including an angulate member having one end portion extending through and engaging a wall of the box, the other end terminating in a tapped aperture; a hollow member, internally and externally threaded, adapted to extend through said aperture; and a threaded element adapted to extend into and engage said hollow member.

FREDERICK B. ADAM.